US009800567B2

(12) United States Patent
Petrov et al.

(10) Patent No.: US 9,800,567 B2
(45) Date of Patent: Oct. 24, 2017

(54) AUTHENTICATION OF NETWORK NODES

(71) Applicants: Petar D. Petrov, Sofia (BG); Nikolai Tankov, Sofia (BG)

(72) Inventors: Petar D. Petrov, Sofia (BG); Nikolai Tankov, Sofia (BG)

(73) Assignee: SAP SE, Walldorf (DE)

( * ) Notice: Subject to any disclaimer, the term of this patent is extended or adjusted under 35 U.S.C. 154(b) by 451 days.

(21) Appl. No.: 14/230,428

(22) Filed: Mar. 31, 2014

(65) Prior Publication Data

US 2015/0281217 A1    Oct. 1, 2015

(51) Int. Cl.
*H04L 29/06* (2006.01)
*H04L 29/08* (2006.01)

(52) U.S. Cl.
CPC ...... *H04L 63/0823* (2013.01); *H04L 63/0876* (2013.01); *H04L 63/105* (2013.01); *H04L 67/1004* (2013.01)

(58) Field of Classification Search
CPC ............. H04L 63/0823; H04L 63/0876; H04L 67/1004; H04L 63/105
See application file for complete search history.

(56) References Cited

U.S. PATENT DOCUMENTS

| 7,366,892 | B2 | 4/2008 | Spaur et al. |
| 8,095,658 | B2 | 1/2012 | Ashley et al. |
| 8,180,891 | B1 * | 5/2012 | Harrison ................. H04L 63/10 709/224 |
| 8,266,676 | B2 | 9/2012 | Hardjono et al. |
| 8,424,058 | B2 | 4/2013 | Vinogradov et al. |
| 2005/0114270 | A1 * | 5/2005 | Hind .................... G06Q 20/367 705/64 |
| 2005/0188420 | A1 * | 8/2005 | Benantar ............. H04L 63/0823 726/3 |
| 2005/0251856 | A1 | 11/2005 | Araujo et al. |
| 2005/0262357 | A1 | 11/2005 | Araujo et al. |
| 2006/0010442 | A1 | 1/2006 | Desai et al. |
| 2007/0255841 | A1 * | 11/2007 | Chong ................. H04L 63/0807 709/229 |
| 2009/0245184 | A1 * | 10/2009 | Torres ..................... H04W 4/02 370/329 |

(Continued)

FOREIGN PATENT DOCUMENTS

EP    1684169 A1    7/2006

*Primary Examiner* — Hadi Armouche
*Assistant Examiner* — Cheng-Feng Huang

(57) ABSTRACT

Various embodiments of systems and methods of network nodes authentication are described herein. In one aspect, a provisioning of an application in a specified computing environment is requested, where the application is operable of providing at least one kind of services to online clients. One or more servers are instantiated to deploy the application, where at least one of the servers may be a virtual machine. A globally unique identifier (GUID) for the application is generated and embedded in a security certificate associated with the deployed application. A correspondence between the GUID and the network address or the host name of the server is stored. In another aspect, a server request is forwarded for processing by the application or canceled based on a comparison between the network address or the host name of the server deploying the application, and the network address or the host name corresponding to the GUID.

14 Claims, 5 Drawing Sheets

(56) References Cited

U.S. PATENT DOCUMENTS

| | | | |
|---|---|---|---|
| 2010/0002722 A1* | 1/2010 | Porat | H04L 45/02 370/467 |
| 2010/0094674 A1* | 4/2010 | Marriner | G06Q 10/06 705/26.1 |
| 2010/0332825 A1* | 12/2010 | Bradley, II | H04L 63/0823 713/158 |
| 2011/0138457 A1 | 6/2011 | Jolfaei | |
| 2011/0258692 A1 | 10/2011 | Morrison et al. | |
| 2012/0036565 A1* | 2/2012 | Gamez | G06F 21/41 726/5 |
| 2012/0036569 A1* | 2/2012 | Cottrell | G06F 21/41 726/7 |
| 2012/0260330 A1 | 10/2012 | Zlatarev et al. | |
| 2012/0265976 A1 | 10/2012 | Spiers et al. | |
| 2013/0061293 A1 | 3/2013 | Mao | |
| 2013/0078948 A1* | 3/2013 | Pecen | H04L 63/0823 455/411 |
| 2013/0246589 A1 | 9/2013 | Klemba et al. | |
| 2013/0326346 A1 | 12/2013 | Zhu et al. | |
| 2014/0007187 A1* | 1/2014 | Harrison | H04L 63/10 726/1 |
| 2014/0032897 A1* | 1/2014 | Datta | H04L 63/0823 713/151 |
| 2014/0046772 A1* | 2/2014 | Raman | G06Q 30/0255 705/14.66 |
| 2014/0181931 A1* | 6/2014 | Bokarius | G06F 21/41 726/6 |
| 2014/0189118 A1* | 7/2014 | Hunter | H04L 65/40 709/225 |
| 2014/0189355 A1* | 7/2014 | Hunter | H04L 63/06 713/171 |
| 2015/0095645 A1* | 4/2015 | Eldar | G06F 21/6209 713/168 |
| 2015/0149609 A1* | 5/2015 | Zou | H04L 67/2833 709/224 |

\* cited by examiner

AUTHENTICATION OF NETWORK NODES

BACKGROUND

Usually, the different scenarios of providing online services, e.g., software as a service (SaaS), platform as a service (PaaS), infrastructure as a service (IaaS), etc., are commonly referred to as cloud computing. Typically, the servers, either physical or virtual, that are hosting such online services, e.g., by running corresponding software applications, are not directly exposed in public networks. The access to the services provided by such hosts is usually dispatched by so called reverse proxies. A reverse proxy is accessible online, e.g., on a public network, and retrieves or exposes the online services to a client or clients that are requesting them by connecting to the corresponding host or hosts via a private network.

One of the challenges in such computing environments is how the applications providing online services are authenticated by the reverse proxies when connections are established. One of the most common methods is by using security certificates which can be verified on both sides of the connection. In this case, the application host name is part of the certificate subject and the reverse proxy can compare the actual name of the host it connects to with the one from the provided certificate. This approach relies on the usage of a domain name system (DNS) service, which can be compromised. Alternatively, the authentication may rely on checking IP addresses instead of host names. However, the private networks like those used in cloud computing environments, reuse a relatively small set of IP addresses, which can be identified and misused for malicious purposes.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for authentication of network nodes are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
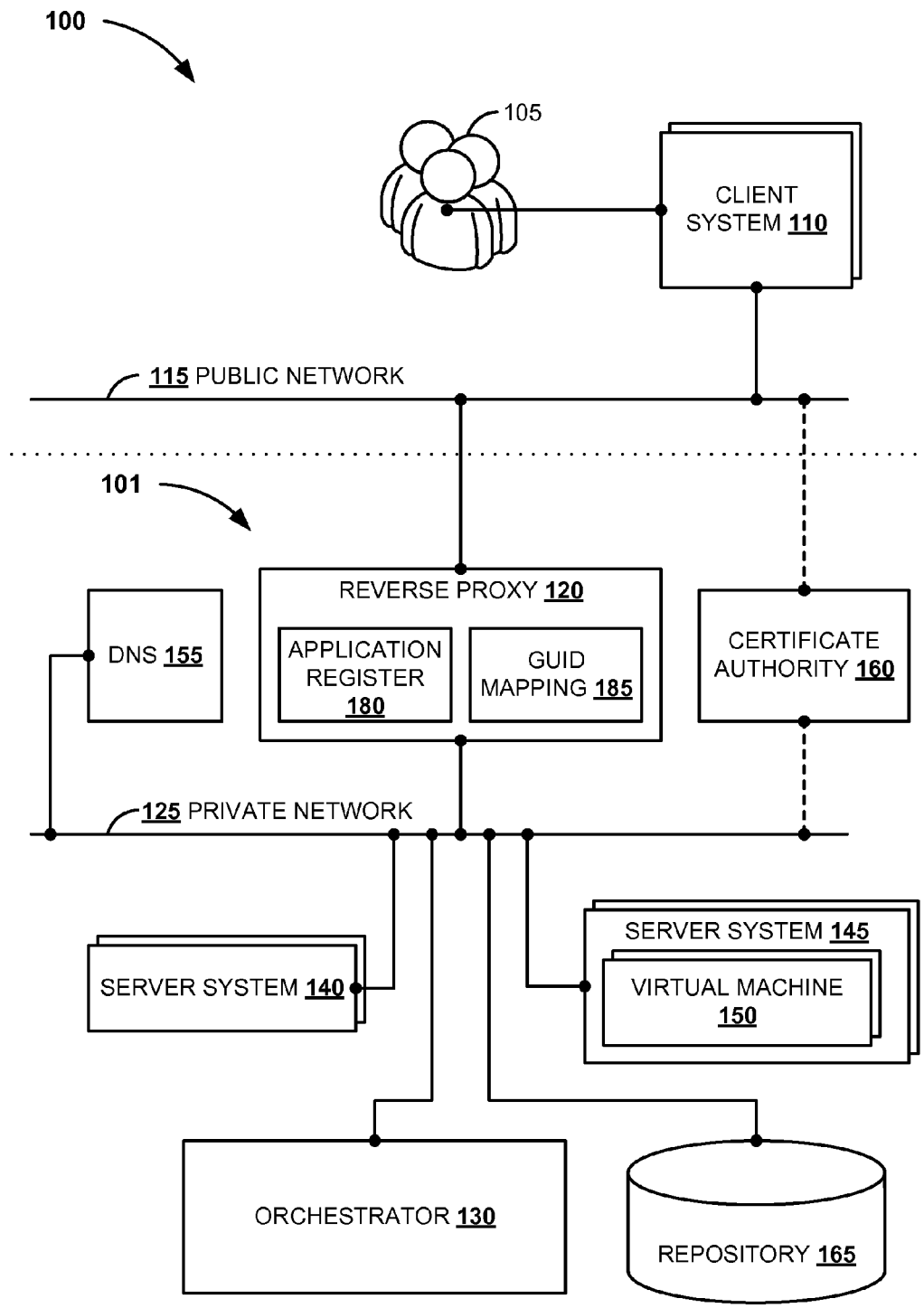
FIG. 1 is a block diagram illustrating a computer system landscape for providing online services, according to one embodiment.

FIG. 1 is a block diagram showing computer system landscape 100 for providing online services, according to one embodiment. The online services may be requested by and provided to one or more consumers illustrated in the figure by client systems 110 operated by users 105. In some embodiments, system landscape 100 may include computer environment 101, e.g., corresponding to a Cloud environment, where users 105 and client systems 110 may represent different tenants of one or more clients to the services provided by the Cloud.

The services and/or the resources required by the users 105 and consumed through the client systems 110 may be provided via public network 115. For example, public network 115 is the Internet, or at least accessible via the Internet. In one embodiment, the services and/or resources requested through the client systems 110 are exposed at the public network 115 by reverse proxy 120. Generally, reverse proxy 120 retrieves resources from server systems 140 and 145 in behalf of client systems 110.

In some embodiments, reverse proxy 120 may act as a dispatcher of service requests received from the client systems 110 to route the requests to corresponding applications hosted by one or more of the server systems 140 and 145. Additionally, reverse proxy 120 may perform load balancing functions, e.g., to route the requests for processing to different server systems 140 and/or 145 according to their current load, when the requests could be handled by applications hosted on more than one server systems (e.g., 140 and/or 145).

The different server systems 140 and 145 may host different software applications to provide different services and/or resources to client systems 110. In one embodiment, server systems 140 may represent physical computer systems, each providing separate environment for deploying and running common or unique software applications to process various client requests, e.g., and to provide various services and/or resources. Server systems 145, on the other hand may represent multi-environment implementations, where on a single physical hardware may simultaneously run more than one computing environments, e.g., multiple virtual machines 150. Similarly to the physical server systems 140, the virtual machines may provide separate environments for deploying and running common or unique software applications to process or serve various client requests. The number and the type of the virtual machines 150 in a cloud computing environment may be determined by the number of the clients and the types of the client requests to be served.

Computing environment 101 as illustrated includes orchestrator 130. In one embodiment, orchestrator 130 could be a computer system or a computer system module that handles the provisioning and the orchestration of server systems 140/145, and especially of virtual machines 150. The provisioning of a server system or of a virtual machine (illustrated by modules 140/145 and 150, respectively) may be requested by an administrator of the cloud, e.g., the computing environment 101. Likewise, the provisioning of a server system or a virtual machine (illustrated by modules 140/145 and 150, respectively) may be predetermined by the dynamics of the number of clients (e.g., client systems 110 and/or users 105) and the number of the service and/or resource requests to be processed.

In one embodiment, the different server systems 140/145 and the different virtual machines have their own domain name and network address, as they may represent different nodes in the private network 125. Depending on the implementation more than one domain name and/or more than one network address may be assigned to a server system and/or a virtual machine. The domain names specified in the private network 125 may be generated and/or stored by DNS 155, local to the private network 125. In one embodiment, when orchestrator 130 provisions a new network node, e.g., a new server system or a virtual machine, one or more corresponding network addresses and a domain names are assigned. The network address may be an Internet protocol (IP) address, e.g., according to the IP suite network model.

In one embodiment, security certificate could be issued and assigned to one or more of the server systems 140/145 and/or one or more of the virtual machines 150. Furthermore, a security certificate may be issued and assigned to one or more of the applications installed on a server system or a virtual machine. Depending on the implementation, such certificates may be issued and/or signed by a local or public Certificate Authority (CA), e.g., CA 160. In one embodiment, CA 160 may be a computer system or a computer system module, internal or local to the Cloud (computing environment 101), respectively connected to private network 125. Alternatively, CA 160 may be a global or public CA, external to the Cloud (computing environment 101), and accessed as a service via public network 115.

The client requests may be provided at reverse proxy 120 by client systems 110 via public network 115. The reverse proxy 120 may use application register 180 including the applications available in the computing environment 101 and operable to process the corresponding client requests. For the computing environment 101, it is important to guarantee the security, and to minimize the risk of malicious misdirection or interception of the communication between reverse proxy 120 and the applications running at one or more of the server systems 140/145 and/or virtual machines 150. Therefore, reverse proxy 120 may authorize the application appropriate to handle a service request based on the domain name of the host of the application and/or the IP address. In one embodiment, the domain name and/or the IP address of an application may be embedded in the security certificate assigned to the application. Thus, before routing the request to the appropriate application, the reverse proxy may authorize the connection to the corresponding host via the private network 125 based on the information stored in the certificate.

In a Cloud (e.g., computing environment 101), a client may install various applications, which would be accessible via private network 125, and respectively, such an application may have access to other modules of the Cloud via private network 125. Thus, a malicious application may gain access to DNS 155 and acquire domain names information. Additionally, because of the relatively short list of network addresses (IP addresses) with which private network 125 usually operates, a user may maliciously identify the network address of a hosting system for an application of interest. For example, this could be done by numerous installations of bogus applications on different virtual machines until identifying or creating the list of the network addresses available at the private network 125.

Therefore, in addition to the domain name and the network address of the hosting system, an application may be further provided with a globally unique identifier (GUID), according to one embodiment. The GUID may be embedded in the certificate assigned to the application, and stored at the reverse proxy 120 mapped against the network address and/or the domain name of the application host, e.g., in GUID mapping module 185 (e.g., GUID mapping table). In one embodiment, the GUID may be generated based on specific algorithm that excludes the possibility for generating duplicate GUID. Further, an exhaustive list of the generated GUIDs could be stored, e.g., at repository 165, to verify that a newly generated GUID cannot be found in the list. In one embodiment, repository 165 could be used for storing various authentication data, including the application register 180, the GUID mapping 185, issued certificates, etc.

Figure 2:
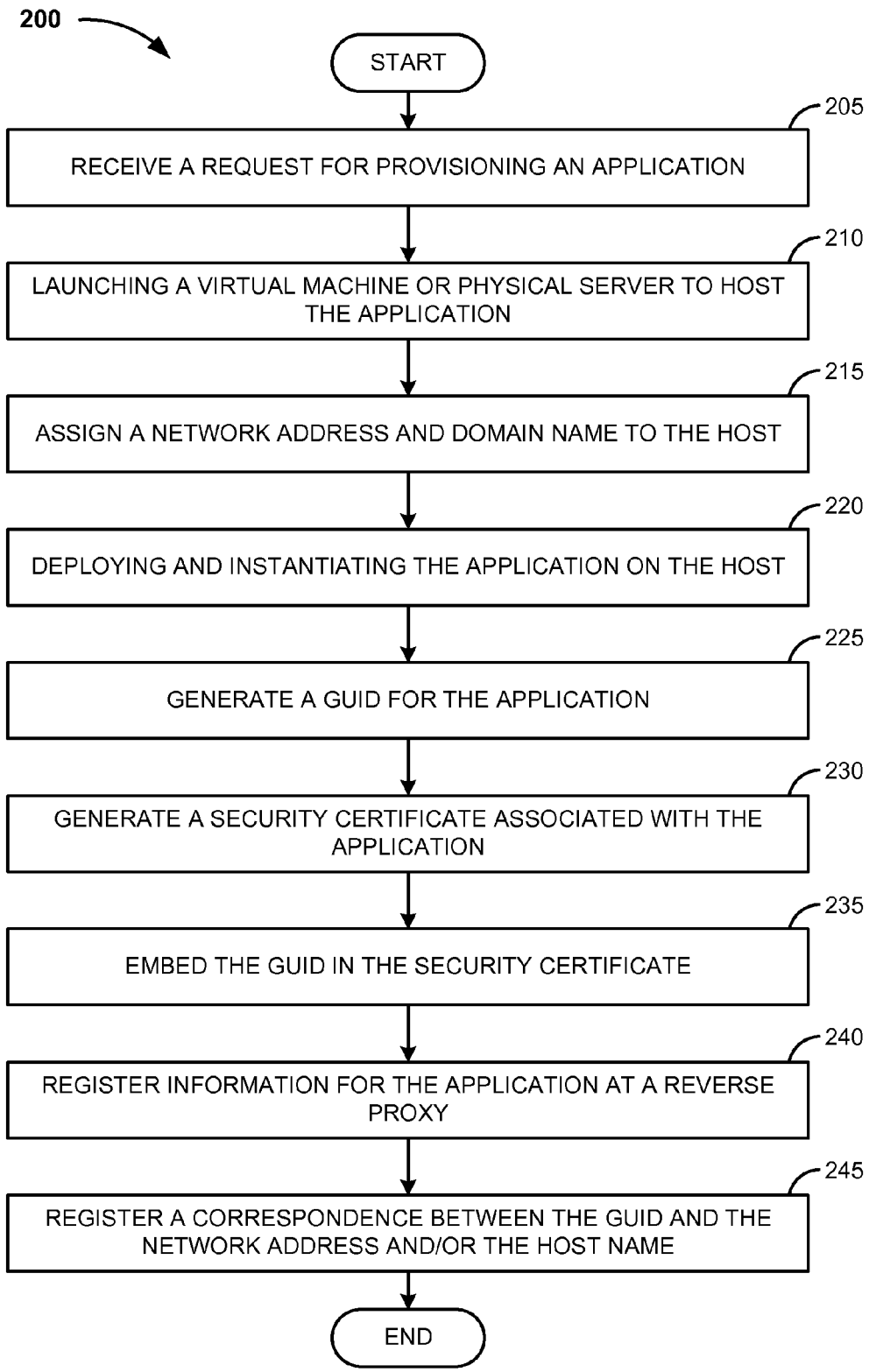
FIG. 2 is a flow diagram illustrating a process of provisioning an application in a Cloud, according to one embodiment.

FIG. 2 shows process 200 for provisioning an application at a computing environment or Cloud, to provide specified service or a set of specified services to one or more online clients, according to one embodiment. At 205, a request for provisioning the application is received at the computing environment. A virtual machine or a physical server to host the application is launched or instantiated at 210. In one embodiment, the host of the application may be dedicated to the client requesting the application provisioning.

At 215, a network address is assigned to the host of the application. Further, a local or global domain name of the host may be also assigned, e.g., to correspond to the network address. The network address may be picked from a list of available network addresses for the private network nodes of the computing environment. The domain name may be stored in a local DNS of the computing environment. Both, the network address and the domain name uniquely identify the server or the virtual machine in the computing environment. However, both the network address and the domain name of the host are vulnerable to hacker attacks.

At 220, the application to be provisioned is deployed and instantiated on the host. For example, a client may provide proprietary application for installation at the computing environment, e.g., to be access by the users or the customers of the client (PaaS scenario). At 225, a GUID is generated for the application to be provisioned. In one embodiment, the generated GUID is used in addition to the host network address and/or the domain name for authentication at the reverse proxy. Further, a security certificate is issued for the application, and signed by local or global CA, at 230. The GUID generated for the application is embedded in the issued certificate at 235. Thus, depending on the implementation, the certificate assigned to the application to be provisioned stores the GUID of the application, e.g., in encrypted or not encrypted format. When the certificate is provided, e.g., for authentication purposes, the GUID may be extracted and/or verified.

Process 200 continues at 240 with registering information regarding the application as deployed at the reverse proxy. This information may contain the domain name and/or the network address of the host, the kind of services providing by the application, information for the type of request to be routed to the application for processing, information for the clients of the application, etc. This registration may help the reverse proxy to identify the application when a corresponding client request is received online. In addition, at 245, a correspondence or mapping between the generated application GUID, and the network address and/or the host domain name is registered at the reverse proxy.

In some embodiments, some or most of the different elements of process 200 may be handled by an orchestrator module of the computing environment, dedicated to provision the application as requested. The orchestrator may be responsible for the automation of the tasks involved with provisioning and managing and coordinating complex software and services. The orchestrator module may manage the communication and the interaction between the different units of the computing environment, including server systems, DNS, CA, etc.

Figure 3:
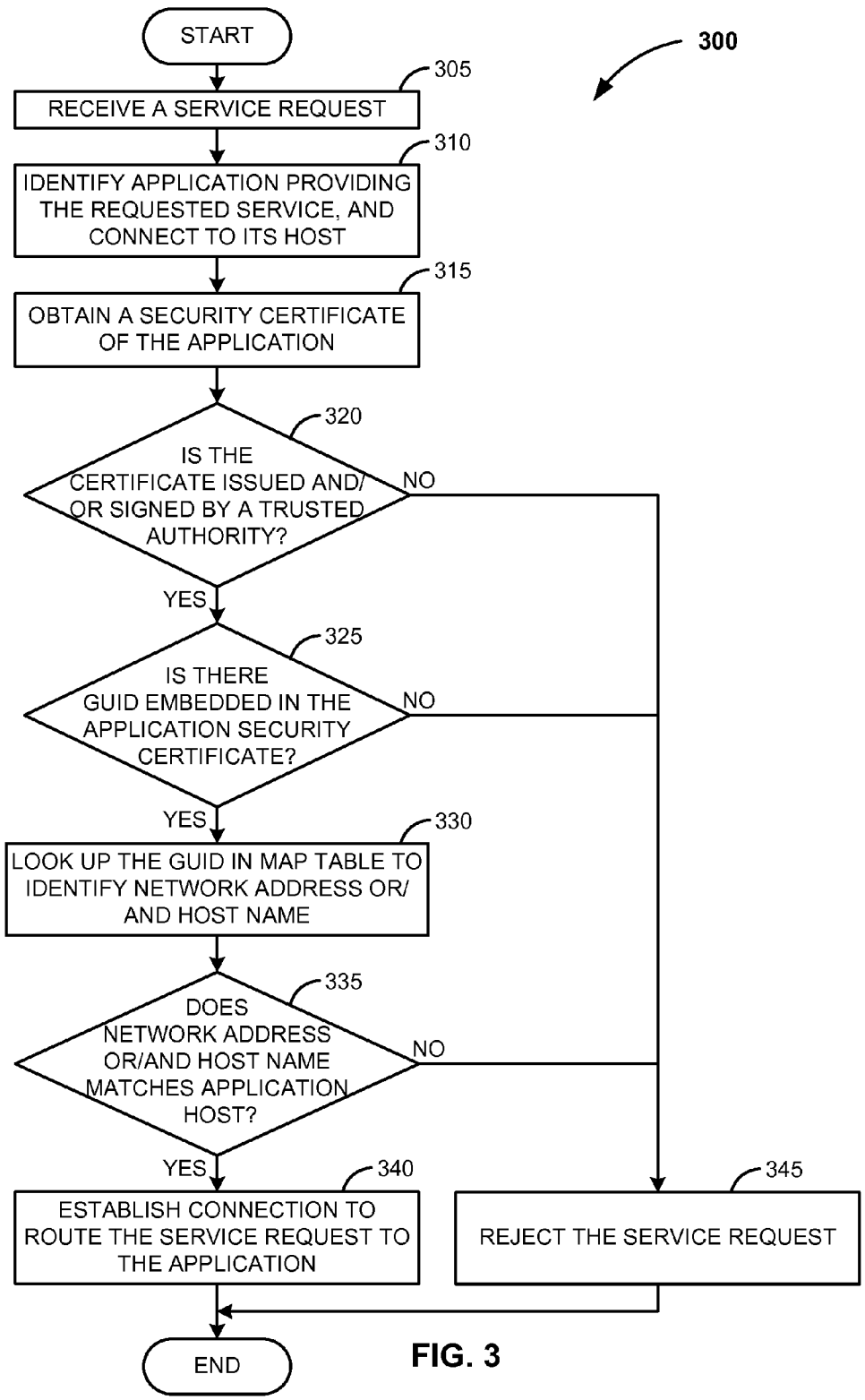
FIG. 3 is a flow diagram illustrating a process of authentication of network nodes in a Cloud, according to one embodiment.

A mechanism for authentication of network nodes in a computing environment providing online services (e.g., Cloud) is shown in FIG. 3, according to one embodiment. At 305, an online service request of a client is received at a reverse proxy, e.g., via the Internet. The reverse proxy may be a system module that dispatches the request for processing to an appropriate application hosted at a server node, either physical or virtual. The reverse proxy could be a load balancer, selecting from a number of running application installations based on the current activities. For example, the reverse proxy may be built upon Big-IP® product of F5 Networks, Inc.

At 310, the application or applications providing the requested service are identified, e.g., based on the registry supported at the reverse proxy of the applications installed in the computing environment. Upon identification of the application (or applications), the reverse proxy connects to the server hosting the application. The server may be a system node of the computer environment, connected to the reverse proxy and to other system nodes, such as other servers, Cloud orchestrator, etc., via a private network. Once the reverse proxy connects to the host, it may obtain or receive a security certificate associated with the application as deployed on the host, at 315. In addition to obtaining the certificate of the application, the reverse proxy may exchange certificates with the host, e.g., to establish secure sockets layer (SSL) communication channel. The SSL communication channel, or secure connection, may be established based on one or more server side security certificates, e.g., for encrypting the communication.

At 320, a check is performed to verify whether the obtained certificate is issued and/or signed by a trusted authority. Only this could guaranty the integrity of the authentication, as otherwise, the certificate could be issued by a malicious application, and could store any fraudulent information, including GUID misappropriation. In one embodiment, the key of the CA used for signing the certificate could be stored on the Cloud orchestrator. Thus, the security of the solution is guaranteed by the level of security of the orchestrator.

At 325, a check is performed to verify whether there is a GUID for the application embedded in the obtained application security certificate. When such GUID is available, it is looked up in a map table available at the reverse proxy to identify a corresponding network address or/and a host name (330). The map table may keep track between the GUIDs of the applications installed in the computing environment and the server nodes (physical or virtual) on which they are installed, according to one embodiment.

Process 300 continues at 335 with a check to verify whether the network address or/and the host name matches the address or/and the name of the host of the application. When there is a match, a connection between the reverse proxy and the host is established to route the service request to the application for processing, at 340. In other words, the requested online service is provided at the reverse proxy through the established connection. The security of the authentication of this connection is guaranteed by the uniqueness of the GUID for the particular application installation. There is no other installation with the same GUID, and even if the host name and/or the host network address are known, it is virtually impossible to generate a same GUID and embed it in the certificate of a malicious application to fraudulently intercept online service requests. The security of the communication is determined by the security or the protection of the reverse proxy and the module generating the GUID (e.g., the orchestrator). Thus, the vulnerability of a local DNS or/and the size of the addressable space of local network of the computing environment are excluded as risk factors.

When the certificate of the application is not signed by an appropriate CA, or when there is no GUID embedded in the application certificate, or when there is no match between the corresponding host network address or/and name in the mapping table and the application host, the service request is rejected at 345. In one embodiment, the network address or/and the name of the host may be embedded in the application certificate as well.

Although processes 200 and 300 are described in the context of computing environment for providing online services, same principles may be implemented in virtually every environment that involves server nodes behind proxy or similar public network gateway. For example, the server nodes may be mobile devices active within a mobile operator network. Thus, the described authentication mechanism could be applied for the communication between the mobile devices and the network operator proxy.

Figure 4:
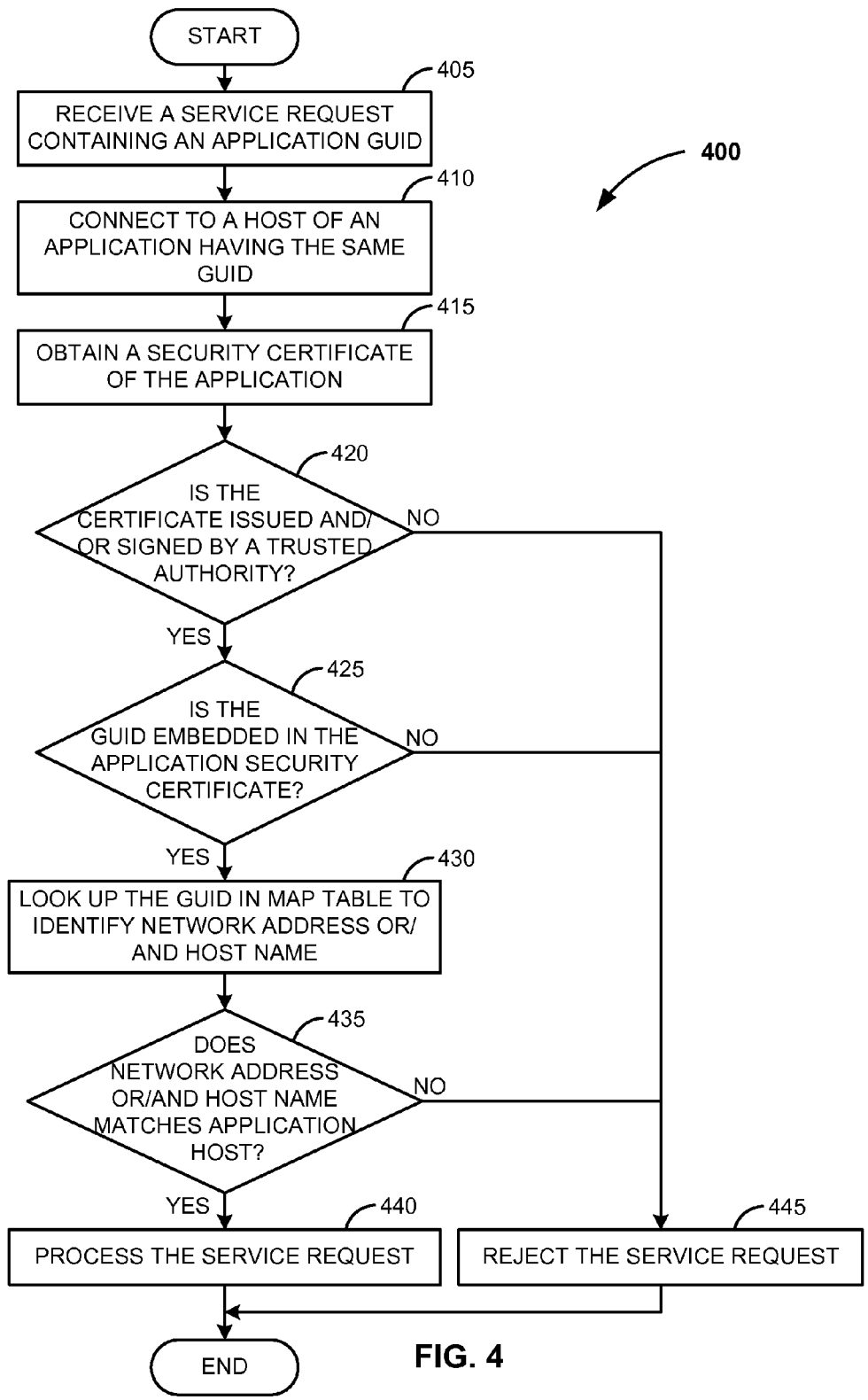
FIG. 4 is a flow diagram illustrating a process to route an online service request to a specific application based on GUID, according to one embodiment.

In addition to the authentication, GUIDs could be applied for routing purposes, according to one embodiment. FIG. 4 shows exemplary process 400 for determining a specific application installation to process online service request, based on the application GUID. Once an application is provisioned in a computing environment for providing online services (e.g., through process 200 shown in FIG. 2), the generated GUID could be provided to the clients of the computing environment. Thus, at 405, a service request containing a specific GUID could be received at the gateway of the computing environment. There may be more than one installations of the application on different hosts, all suitable for processing the service request. However, the gateway or the reverse proxy connects to a host with the application installation having the same GUID as the one received with the request (at 410). The correspondence between GUID and host could be stored at the reverse proxy applications registry.

Process 400 may continue with authentication of the host network node, following the mechanism described with process 300 (FIG. 3). At 415, a security certificate for the application installed on the identified host is obtained. Further, it has to be verified (at 420) that the obtained application certificate is issued, or at least signed by a recognized CA, e.g., stored on a local computer environment orchestrator. At 425, a check is performed to verify whether the same GUID is embedded in the application security certificate. If the GUID is embedded in the certificate, the GUID and the corresponding host network address or/and host name are looked up in the map table at the reverse proxy (430). When the network address or/and the host name from the map table match the network address or/and the name of the server hosting the application identified with the GUID (435 check), the received service request is safely routed to that server and processed by the installed application, at 440.

The service request is respectively rejected, at 445, when either no GUID is embedded in the application certificate, or when the network address/the host name corresponding to the GUID in the map table are different from the address/name of the server hosting the identified application. In some embodiments, there may be additional actions part of process 400, not described in the above example. Additionally, some of the described actions may be missing. For example, the matching network address or host name may be also embedded in the certificate, or it may not be necessary to check the certificate for embedded GUID.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
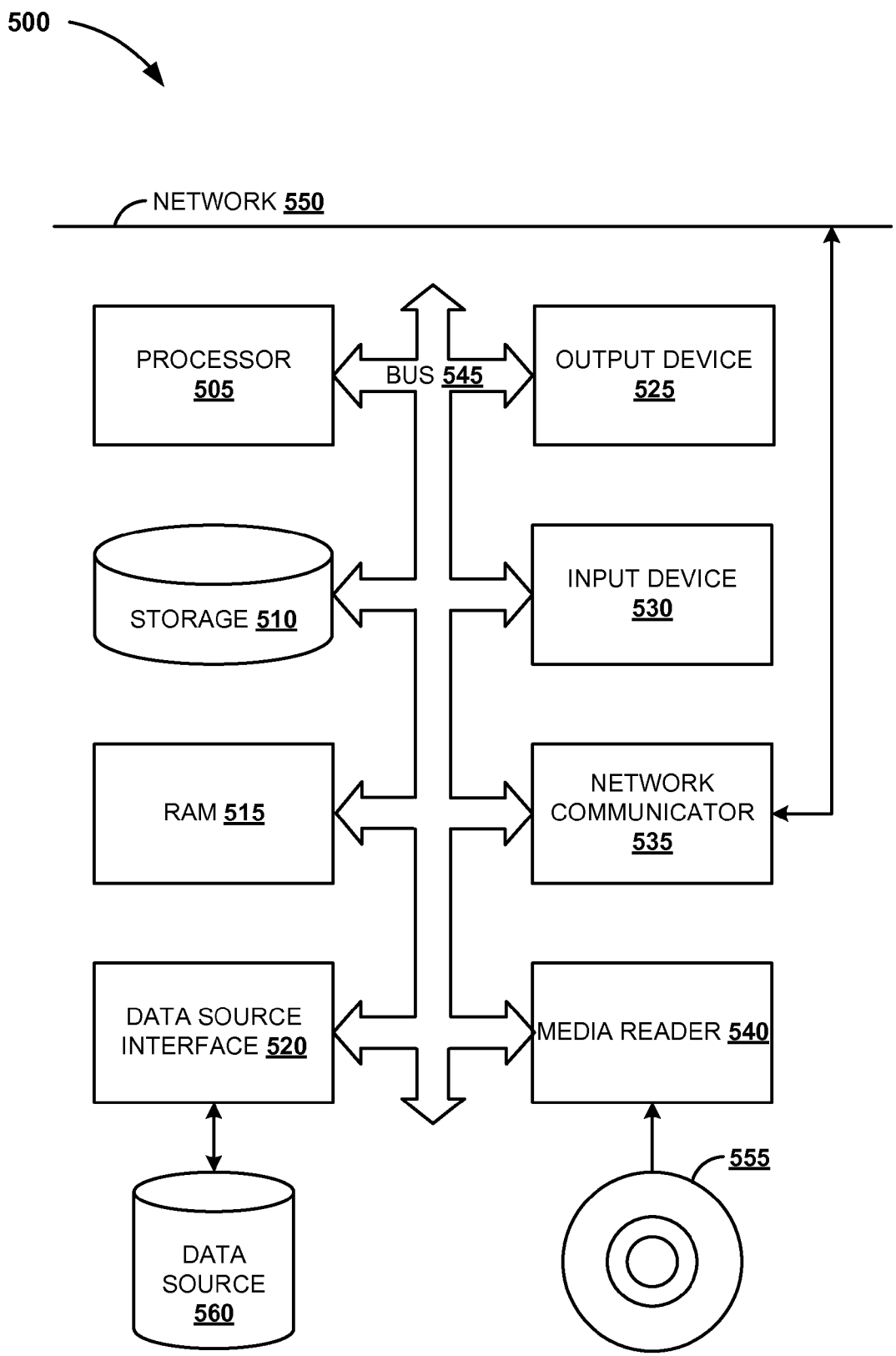
FIG. 5 is a block diagram of an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed via network 550. In some embodiments the data source 560 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer-readable non-transitory medium storing instructions which, when executed by at least one processor, cause a computer system to perform activities comprising:
   upon receiving an online service request, establish a connection to a server hosting an application configured to provide the requested service, wherein the online service request is routed to the application on the server by establishing the connection with the server from a plurality of servers based on an identification, wherein the identification is based on a current load in response to performing a load balancing on the plurality of servers, when the plurality of servers host the application configured to provide the requested service, and wherein before routing the online service request to the application on the server, authorizing the online service request based on information obtained via a security certificate assigned to the application hosted on the server;
   extract a global unique identifier (GUID) of the application hosted on the server from the security certificate associated with the application, wherein the GUID is embedded in the security certificate, and wherein the GUID is uniquely associated with the application;
   identify one or more of a network address and a host name corresponding to the GUID of the application, wherein identifying the one or more of the network address and the host name corresponding to the GUID of the application, comprises: looking up the GUID of the application in a map table, wherein the map table defines correspondence between one or more GUIDs correspondingly associated with one or more applications and one or more of a plurality of network addresses and a plurality of host names; and
   when an identified network address or a host name corresponding to the GUID of the application from the map table matches a network address or a host name associated with the server hosting the application, based on a comparison between the identified network address or the host name corresponding to the GUID of the application and the network address or the host name associated with the server hosting the application, allow access to the application for processing the service request or reject the service request.

2. The computer-readable non-transitory medium of claim 1, wherein establishing the connection to the server comprises: establishing a secure connection to the server based on a server side security certificate.

3. The computer-readable non-transitory medium of claim 1, wherein establishing the connection to the server comprises:
   receiving the GUID of the application hosted at the server associated with the online service request; and
   identifying the server from a plurality of servers hosting the application, based on the GUID of the application hosted by the server.

4. The computer-readable non-transitory medium of claim 1, wherein identifying one or more of the network address and the host name corresponding to the GUID of the application comprises: extracting at least one of the network address and the host name corresponding to the GUID of the application from the security certificate associated with the application.

5. The computer-readable non-transitory medium of claim 1 storing instructions which, when executed by the at least one processor, cause a computer system to perform activities further comprising:
   forward a request to provision the application on at least one server; and
   upon deploying the application at the at least one server, receive at least one new mapping defining correspondence between at least one GUID of the application and one or more of at least one network address and at least one host name of the at least one server.

6. A computer implemented method for authentication of network nodes via a reverse proxy server, the method comprising:
   upon receiving an online service request, establishing a network connection to a server hosting an application configured to provide the requested service, wherein the online service request is routed to the application on the server by establishing the connection with the server from a plurality of servers based on an identification, wherein the identification is based on a current load in response to performing a load balancing on the plurality of servers, when the plurality of servers host the application configured to provide the requested service, and wherein before routing the online service request to the application on the server, authorizing the online service request based on information obtained via a security certificate assigned to the application hosted on the server;
   extracting a global unique identifier (GUID) of the application hosted on the server from a security certificate associated with the application, wherein the GUID is embedded in the security certificate, and wherein the GUID is uniquely associated with the application;
   identifying, by a processor, one or more of a network address and a host name corresponding to the GUID of the application, wherein identifying the one or more of the network address and the host name corresponding to the GUID of the application, comprises: looking up the GUID of the application in a map table, wherein the map table defines correspondence between one or more GUIDs correspondingly associated with one or more applications and one or more of a plurality of network addresses and a plurality of host names; and
   when an identified network address or a host name corresponding to the GUID of the application from the map table matches a network address or a host name associated with the server hosting the application, based on a comparison between the identified network address or the host name corresponding to the GUID of the application and the network address or the host name associated with the server hosting the application, allowing access to the application for processing the service request or rejecting the service request.

7. The computer implemented method of claim 6, wherein establishing the connection to the server comprises: establishing a secure connection to the server based on a server side security certificate.

8. The computer implemented method of claim 6, wherein establishing the connection to the server comprises:
   receiving the GUID of the application hosted at the server associated with the online service request; and
   identifying the server from a plurality of servers hosting the application, based on the GUID of the application hosted by the server.

9. The computer implemented method of claim 6, wherein identifying one or more of the network address and the host name corresponding to the GUID of the application comprises: extracting at least one of the network address and the host name corresponding to the GUID of the application from the security certificate associated with the application.

10. The computer implemented method of claim 6 further comprising:
forwarding a request to provision the application on at least one server; and
upon deploying the application at the at least one server, receiving at least one new mapping defining correspondence between at least one GUID of the application and one or more of at least one network address and at least one host name of the at least one server.

11. A computer system to authenticate network nodes via a reverse proxy server, the system comprising:
a memory to store instructions; and
a processor coupled to the memory to execute the instructions to perform operations comprising:
upon receiving an online service request, establish a network connection to a server hosting an application configured to provide the requested service wherein the online service request is routed to the application on the server by establishing the connection with the server from a plurality of servers based on an identification, wherein the identification is based on a current load in response to performing a load balancing on the plurality of servers, when the plurality of servers host the application configured to provide the requested service, and wherein before routing the online service request to the application on the server, authorizing the online service request based on information obtained via a security certificate assigned to the application hosted on the server;
extract a global unique identifier (GUID) of the application hosted on the server from a security certificate associated with the application, wherein the GUID is embedded in the security certificate, and wherein the GUID is uniquely associated with the application;
identify one or more of a network address and a host name corresponding to the GUID of the application, wherein identifying the one or more of the network address and the host name corresponding to the GUID of the application, comprises: looking up the GUID of the application in a map table, wherein the map table defines correspondence between one or more GUIDs correspondingly associated with one or more applications and one or more of a plurality of network addresses and a plurality of host names; and
when an identified network address or a host name corresponding to the GUID of the application from the map table matches a network address or a host name associated with the server hosting the application, based on a comparison between the identified network address or the host name corresponding to the GUID of the application and a network address or a host name associated with the server hosting the application, allow access to the application for processing the service request or rejecting the service request.

12. The computer system of claim 11, wherein establishing the connection to the server comprises: establishing a secure connection to the server based on a server side security certificate.

13. The computer system of claim 11, wherein establishing the connection to the server comprises:
receiving the GUID of the application hosted at the server associated with the online service request; and
identifying the server from a plurality of servers hosting the application, based on the GUID of the application hosted by the server.

14. The computer system of claim 11, wherein identifying one or more of the network address and the host name corresponding to the GUID of the application comprises: extracting at least one of the network address and the host name corresponding to the GUID of the application from the security certificate associated with the application.

* * * * *